United States Patent [19]

Halverson

[11] 4,339,720

[45] Jul. 13, 1982

[54] TELLURIC NOISE CANCELLATION IN INDUCED POLARIZATION PROSPECTING

[75] Inventor: Mark O. Halverson, Collin County, Tex.

[73] Assignee: The Anaconda Company, Denver, Colo.

[21] Appl. No.: 137,430

[22] Filed: Apr. 4, 1980

[51] Int. Cl.³ .......................... G01V 3/02; G01V 3/38
[52] U.S. Cl. ...................................... 324/362; 324/349
[58] Field of Search .............. 324/323, 334, 335, 345, 324/346, 349, 357, 362

[56] References Cited

U.S. PATENT DOCUMENTS

| | | | |
|---|---|---|---|
| 3,402,348 | 9/1968 | Hoehn et al. | 324/346 |
| 3,967,190 | 6/1976 | Zonge | 324/362 |
| 3,984,759 | 10/1976 | St-Amant et al. | 324/362 |
| 4,041,372 | 8/1977 | Miller et al. | 324/362 X |

*Primary Examiner*—Gerard R. Strecker
*Attorney, Agent, or Firm*—Hubbard, Thurman, Turner, Tucker & Glaser

[57] ABSTRACT

Apparatus and method for generating a record of telluric noise which is substantially free of induced polarization signals and is suitable for removal of noise components from induced polarization signal records. The apparatus includes a single pair of telluric noise sensing electrodes positioned in alignment with, but substantially beyond the ends of, a somewhat conventional induced polarization electrode spread. The method includes recording of telluric noise occurring at the time of detection of induced polarization signals and the subtraction of a fraction of the telluric noise record from the induced polarization signal records.

11 Claims, 1 Drawing Figure

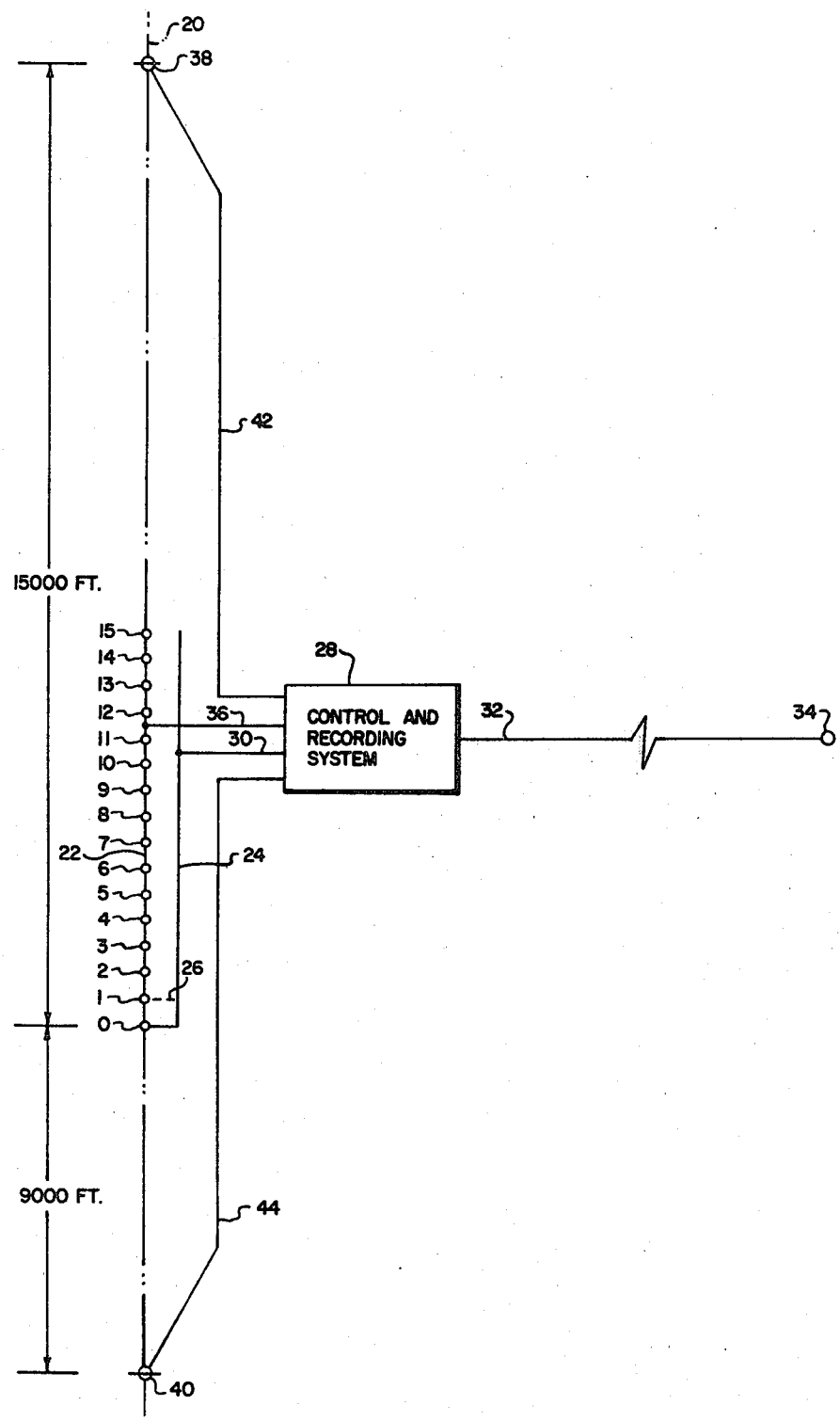

TELLURIC NOISE CANCELLATION IN INDUCED POLARIZATION PROSPECTING

BACKGROUND OF THE INVENTION

The present invention relates to induced polarization mineral prospecting and more particularly to improved apparatus and methods for removing noise components from the signals detected in induced polarization prospecting.

The basic methods and apparatus used for induced polarization mineral prospecting are well known and have been in use for many years. For example, U.S. Pat. No. 3,967,190 issued to Zonge, provides a general description of the older techniques, together with more detailed descriptions of more modern signal processing methods. Most modern improvements to the process have involved efforts to discriminate between various types of minerals and to increase the depth of exploration. The Zonge patent deals primarily with signal processing techniques which allow particular plots of induced polarization data to be generated for comparison to models to aid in discrimination of various minerals.

As with any other type of signal processing system, accuracy depends upon the signal-to-noise ratio of the recorded information. For shallow prospecting, the signal-to-noise ratio is usually quite high. However, as the exploration depth is increased, the signal levels are reduced rapidly. The signal level can, of course, be improved by increasing the level of current input, but this approach has definite limits. At the greater search depths, electromagnetic coupling or dispersion problems require use of lower frequency input signals. The telluric noise level increases at these lower frequencies further reducing the signal-to-noise ratio. Thus, as search depth is increased, the cancellation of telluric noise becomes more important.

The above referenced Zonge patent teaches the use of a variable frequency transmitter to provide induced polarization data over a range of frequencies. This spectral data is intended to provide information identifying the type of material detected, e.g. sulphides or clay. All frequencies used in this process must of course be below the frequency at which dispersion degrades the signals. Thus, if a deep looking spectral survey is run, very low frequencies must be employed and the telluric noise becomes an even more serious problem.

It is well known that naturally occurring earth currents, known as telluric currents, are responsible for a major portion of the noise normally encountered in any type of induced polarization prospecting method. Various efforts have been made in the past to provide additional electrodes in an induced polarization electrode spread for providing an indication of the telluric noise level so that a correction factor may be generated for improving the signal-to-noise ratio of the recorded induced polarization signals. A typical approach has been to lay out a linear spread of electrodes along a survey path with a portion of the electrodes being used as current inputs and sensing electrodes during each step of the induced polarization prospecting process. Electrodes on opposite ends of the spread are often employed together with one additional lateral or offset electrode for recording telluric noise indications. In such an arrangement, the telluric noise record generally includes a fairly large component of the induced polarization input signal which must usually be removed before the noise record is used to generate a correction factor for the desired signal records. If such corrections are not made, the use of the recorded noise to correct the desired signal records may cause distortion of the signals. It is for this reason that fairly complicated processing programs have been developed for correcting the noise record by processing both in-line and normal telluric noise records. Such processing obviously increases the complexity of the prospecting systems, may delay the application of the correction factor, and may degrade the overall accuracy of the prospecting system.

Thus, it is seen that it is desirable to provide records of telluric noise occurring along an induced polarization prospecting path with such records being substantially free of induced polarization signal components. In addition, it is desirable that such signals be acquired in a simple manner and be in such form that they may be applied to correction of desired induced polarization signals without further processing.

SUMMARY OF THE INVENTION

Accordingly, an object of the present invention is to provide an improved induced polarization electrode arrangement.

Another object of the present invention is to provide a method for detecting telluric noise occurring during an induced polarization prospecting process for generation of correction signals.

An induced polarization electrode arrangement according to the present invention includes a first spread of electrodes distributed along a prospecting path for transmission of induced polarization input currents and sensing of voltage signals. In addition, first and second telluric noise sensing electrodes are positioned substantially on the prospecting path, but spaced from a current input electrode of the first spread by a distance at least 1.5 times the maximum search depth of the first electrode spread. Telluric noise is recorded by use of the telluric sensing electrodes simultaneously with the operation of the induced polarization electrode spread. Preselected portions of the sensed telluric noise are used to correct the induced polarization signals to improve the signal-to-noise ratio of the desired signals.

BRIEF DESCRIPTION OF THE DRAWINGS

The present invention may be better understood by reading the following detailed description of the preferred embodiments with reference to the single FIGURE which is a partially schematic plan view of an induced polarization electrode arrangement according to the present invention.

DESCRIPTION OF THE PREFERRED EMBODIMENTS

With reference now to the single FIGURE, an improved induced polarization electrode arrangement will be described. A typical prospecting path is indicated by the line 20 running from top to bottom in the FIGURE. A somewhat conventional induced polarization electrode spread is indicated by the electrodes numbered 0 through 15. A twenty-six conductor seismic cable 22 is laid out along the path 20 with connectors at the locations of each of the electrodes 0 through 15. In this preferred embodiment, the takeout spacing and accordingly the spacing between the electrodes in this first spread is 500 feet. The takeouts are preferably of the type which allow any one of the electrodes to be connected to any conductor in the cable 22 so that a roll-along mode of operation may be easily implemented. In this preferred embodiment, a single conductor cable 24 is laid out parallel to, but spaced a short distance from, the main multi-conductor cable 22. The cable 24 is fairly heavy, typically ten gauge copper, and is used for the current input signal. For an initial test setup, the cable 24 is connected to the electrode designated 0. As indicated by the dotted line 26, the cable 24 may also be connected to another electrode, such as electrode 1, at another point in the survey process. The physical separation of the cables 22 and 24 helps to reduce electromagnetic coupling of the input current signal to the output lines contained in cable 22. In the preferred embodiment, an initial setup includes the current cable 24 connected to electrode 0 and electrodes numbered 1 through 13 connected to appropriate conductors in the cable 22 to provide a total of twelve sensing dipoles and a maximum search depth of 6,000 feet. The maximum search depth is defined as the spacing from the current input electrode to the nearest electrode of the most distant voltage sensing dipole. In this case, the electrodes 12 and 13 form the most distant active pair of electrodes.

A control and recording system 28 may be generally conventional, for example of the type illustrated in the above referenced Zonge patent. System 28 includes a current output lead 30 connected to the current cable 24. In addition, the system 28 includes a return current output 32 which is connected to a return electrode 34 spaced laterally off of the prospecting path 20 by a substantial distance, for example two and one half times the maximum search depth. This is a conventional arrangement which allows the return electrode to be considered located at infinity. The system 28 also includes a multi-conductor cable 36 connected to the cable 22 for receiving the voltage signals detected by the active dipoles.

The induced polarization electrode spread thus far described is normally referred to as a pole-dipole spread. It will be appreciated that a dipole-dipole arrangement may also be employed in the present invention. That is, two of the electrodes 0 through 15 could be current electrodes, one for input and one return. In any case, at least one of the induced polarization electrodes 0 through 15 is used as a current electrode.

The portions of FIG. 1 thus far described are generally conventional and may be used for induced polarization prospecting by various known methods such as time domain or frequency domain methods. The 6,000 foot maximum search depth of this induced polarization spread does make this a fairly deep prospecting arrangement. In the preferred embodiment, the borad spectrum method is also used with the low end of the frequency band being in the range of 0.01 to 0.001 Hz. At these great depths and low frequencies the accurate cancellation of telluric noise from the signals received from the sensing dipoles is quite important.

In accordance with the present invention, a pair of telluric sensing electrodes 38 and 40 are positioned substantially on the prospecting path 20 but substantially beyond the ends of the basic electrode spread. Thus as indicated in the FIGURE, the electrode 38 is preferably positioned at least 15,000 feet from the position of electrode 0 and electrode 40 is located 9,000 feet from the same position. Electrode 40 is therefore positioned from the current electrode 0 by a distance which is one and a half times as great as the maximum search depth of the basic induced polarization prospecting spread. Electrode 38 is positioned considerably further from electrode 0. The purpose of this nonuniform spacing is to allow a substantial roll-along distance without requiring movement of the telluric sensing electrodes 38 and 40. Thus, the second setup involves the connection of current input cable 24 to current electrode 1 and the connection of electrode 14 to an appropriate conductor in the cable 22. This roll-along process can be continued until the current cable 24 is connected to the electrode 12, at which point it will be located 9,000 feet from electrode 38 and 15,000 feet from electrode 40. It will be appreciated that, as in a typical roll-along process, additional lengths of the cable 22 will be added to the end of the initially laid out cable as the locations of the active electrodes require.

The electrodes 38 and 40 are connected to the system 28 by separate single conductor cables or field wires 42 and 44 respectively. The cables 42 and 44 are laid out generally along the path 20 but are preferably displaced a short distance from both cables 22 and 24 to reduce coupling of the induced polarization input current signals from the telluric noise cables.

In a preferred method of operation, the recording system 28 includes a multi-channel recorder which records returns detected by the appropriate active sensing dipoles on twelve channels while simultaneously recording the telluric noise detected by electrodes 38 and 44 on a separate channel. In this way, the telluric noise occurring at precisely the same time as the detected induced polarization signals is available for appropriate processing to improve the signal-to-noise ratio of the recorded signals.

It has generally been believed that telluric noise is sufficiently coherent to allow sensing of the noise level from opposite ends of the conventional spread and use of the record for correction purposes. As noted above, such records have a large induced polarization signal component if recorded during the actual induced polarization process which is necessary if accurate corrections are to be made. The present invention is based upon the discovery that the coherency of the telluric noise is much greater than previously thought. Thus, as shown in the FIGURE, the telluric noise is measured between electrodes spaced 24,000 feet apart, while the maximum spread in the active induced polarization electrodes is only 6,000 feet and each sensing dipole is only 500 feet long. The sensed telluric noise still very accurately represents the telluric noise component detected by the individual sensing dipoles.

The sensed telluric noise, due to the great spacing of the noise sensing electrode, has only a very small component of the induced polarization signal. As a result, it is generally unnecessary to use special processing to remove the induced polarization signal component from the detected telluric noise.

As noted above, the preferred use of the apparatus shown in the FIGURE is to immediately record the telluric noise and a number of channels of induced polarization signals. Various stacking methods are then normally used to provide composite decay curves for each signal channel in the time domain prospecting method. Known least-squares algorithms are then used to select coefficients or appropriate percentages of the noise record which should be applied to each signal record to achieve signal records with the best signal-to-noise ratio. Little or no distortion occurs from omitting the step of removing induced polarization signal components from the noise record prior to correcting the signal records.

It was anticipated that a much simpler signal correction method could be used. This would involve simply subtracting a fraction of the noise from the signals. The fraction would be determined by the ratio of the individual signal sensing dipole lengths to the spacing between the noise sensing electrodes. In the typical arrangement where all sensing dipoles are of the same length, the coefficients would all be the same. This method would be accurate if the noise was truly coherent and the earth was very uniform along the prospecting path. Experience has shown that earth nonuniformities usually prevent application of this method. Coefficients determined by the least-squares method have been found to be in a very close range when electrodes were evenly spaced and the surface conditions were fairly uniform. These test results indicate that the coherency of the noise itself is extremely good. However, due to the rare occurrence of truly uniform surface conditions, the application of this simple correcting method is expected to be limited to, for example, the real time generation of initial field records for verifying proper equipment operation. The more complicated coefficient selection methods are therefore preferred for generation of plots to be used for actual interpretation purposes.

While the present invention has been illustrated in terms of a particular electrode arrangement and described in terms of particular methods of use, it is apparent that various modifications and changes can be made within the scope of the present invention as defined by the appended claims.

What is claimed is:

1. A method of removing telluric noise from induced polarization signals comprising:

positioning first and second telluric noise sensing electrodes on the earth's surface on opposite ends of and substantially in alignment with an induced polarization electrode spread and each spaced from a current electrode of said spread by a distance at least 1.5 times the maximum search depth of said spread;

detecting telluric noise by means of said first and second noise sensing electrodes simultaneously with detection of induced polarization signals by means of said spread; and using preselected portions of the detected telluric noise to correct the induced polarization signals to provide induced polarization signals substantially free of telluric noise.

2. The method of claim 1 wherein said preselected portions of said telluric noise are fractions determined as a function of the relative spacings of adjacent sensing electrodes in said spread and of said first and second telluric noise sensing electrodes.

3. The method of claim 1 wherein said preselected portions of said telluric noise are subtracted from said induced polarization signals.

4. The method of claim 3 further including, prior to said subtracting step, recording said detected telluric noise simultaneously with recording of said induced polarization signals and reproducing said recorded noise and signals at the time of said subtracting step.

5. A method of providing an indication of a telluric noise component of induced polarization signals, with said indication being substantially free of induced polarization signals comprising:

positioning first and second telluric noise sensing electrodes on the earth's surface on opposite ends of and substantially in alignment with an induced polarization electrode spread and each spaced from a current electrode of said spread by a distance at least 1.5 times the maximum search depth of said spread; and detecting telluric noise by means of said first and second noise sensing electrodes simultaneously with detection of induced polarization signals by means of said spread.

6. Improved induced polarization prospecting apparatus including:

a plurality of induced polarization electrodes distributed along a prospecting path on the earth's surface, at least one of said electrodes forming a current input electrode and the remaining of said electrodes forming a plurality of induced polarization sensing dipoles;

means coupled to said plurality of induced polarization sensing dipoles for detecting induced polarization signals;

first and second telluric noise sensing electrodes positioned along said path on opposite sides of said plurality of induced polarization electrodes and each spaced from the nearest of said at least one current electrode by a distance at least 1.5 times the distance from said at least one current electrode to the most distant of said sensing dipoles; and means coupled to said first and second telluric noise sensing electrodes for detecting telluric noise.

7. Apparatus according to claim 6 wherein said plurality of induced polarization electrodes comprises fourteen electrodes positioned about 500 feet apart along said path.

8. Apparatus according to claim 7 wherein said first and second noise sensing electrodes are positioned at least 9,000 feet from the nearest of said fourteen electrodes.

9. Apparatus according to claim 6 wherein said means coupled to said plurality of induced polarization sensing dipoles and said means coupled to said first and second telluric noise sensing electrodes further include a multi-channel recording system coupled to said induced polarization sensing dipoles and to said telluric noise sensing electrodes for simultaneously recording induced polarization signals detected by each of said induced polarization sensing dipoles and telluric noise detected by said telluric noise sensing electrodes.

10. Apparatus according to claim 9 further including a multi-conductor cable positioned along said prospecting path and including conductors for connecting each of said induced polarization electrodes to said recording system.

11. Apparatus according to claim 10 further including first and second single conductor cables positioned generally along said path spaced from said multi-conductor cable, said first and second single conductor cables connecting said first and second noise sensing electrodes to said recording system.

* * * * *